(12) United States Patent
Kanzaki et al.

(10) Patent No.: US 6,881,517 B1
(45) Date of Patent: Apr. 19, 2005

(54) BINDER FOR ELECTRODE FOR LITHIUM ION SECONDARY BATTERY, AND UTILIZATION THEREOF

(75) Inventors: Atsuhiro Kanzaki, Kawasaki (JP); Kouichirou Maeda, Tokyo (JP); Haruhisa Yamamoto, Tokyo (JP)

(73) Assignee: Zeon Corporation, Tokyo (JP)

( * ) Notice: Subject to any disclaimer, the term of this patent is extended or adjusted under 35 U.S.C. 154(b) by 418 days.

(21) Appl. No.: 10/069,127

(22) PCT Filed: Sep. 1, 2000

(86) PCT No.: PCT/JP00/05963

§ 371 (c)(1),
(2), (4) Date: Mar. 1, 2002

(87) PCT Pub. No.: WO01/18892

PCT Pub. Date: Mar. 15, 2001

(30) Foreign Application Priority Data

Sep. 3, 1999 (JP) .......................... 11-250694

(51) Int. Cl.[7] ............................... H01M 4/62
(52) U.S. Cl. ...................... 429/217; 526/335
(58) Field of Search .................. 429/217; 526/335, 526/340, 340.4

(56) References Cited

U.S. PATENT DOCUMENTS

| 3,050,513 A | 8/1962 | Zelinski et al. ............ 260/94.3 |
| 5,262,255 A | 11/1993 | Ito et al. ...................... 429/217 |
| 6,200,707 B1 | 3/2001 | Takada et al. .............. 429/304 |

FOREIGN PATENT DOCUMENTS

| JP | 04-255670 | 9/1992 |
| JP | 06-215761 | 8/1994 |
| JP | 07-335221 | 12/1995 |
| JP | 09-213337 | 8/1997 |
| JP | 09-320604 | 12/1997 |
| JP | 11-086899 | 3/1999 |
| JP | 2000-123874 | 4/2000 |
| WO | WO99/12221 | 3/1999 |

OTHER PUBLICATIONS

English Abstract and Translation of JP–A H8–250123, published Sep. 27, 1996.

Supplemental European Search Report dated Jul. 24, 2003.

International Search Report dated Nov. 21, 2000, published with WO 01/18892, Mar. 15, 2001.

*Primary Examiner*—Jonathan Crepeau
(74) *Attorney, Agent, or Firm*—Armstrong, Kratz, Quintos, Hanson & Brooks, LLP

(57) ABSTRACT

A binder for a lithium ion secondary battery characterized by comprising a polymer containing structural units derived from 1,3-butadiene, said polymer having a 1,2-vinyl structure content in the range of 2% to 25% by mole. A lithium ion secondary battery provided with an electrode made using this binder exhibits improved characteristics at repetition of charge-discharge cycle and improved storage stability.

9 Claims, No Drawings

BINDER FOR ELECTRODE FOR LITHIUM ION SECONDARY BATTERY, AND UTILIZATION THEREOF

TECHNICAL FIELD

This invention relates to a binder for an electrode for a lithium ion secondary battery, a composition comprising the binder, a slurry of the composition, an electrode made by using the slurry and a lithium ion secondary battery provided with the electrode.

BACKGROUND ART

In recent years, portable electronic appliances such as a notebook-sized personal computer, a portable telephone and a personal digital assistant have spread. Among secondary batteries used as a power source of the portable electronic appliances, lithium ion secondary batteries are widely used. To enhance the expediency of portable electronic appliances, they have been rapidly rendered small in size, thin in thickness, light in weight and high in performances. Consequently the portable electronic appliances have spread far and wide. With the spread thereof, requirements for rendering secondary batteries small in size, thin in thickness, light in weight and high in performances are becoming severe.

To meet the above-mentioned requirements, electrodes, electrolytes and other battery elements or parts are being examined. As for electrodes, an active material, a collector and a polymer binder for adhering an active material to a collector are being examined. Usually, a polymer binder is mixed with water or an organic liquid to obtain a binder composition, and the binder composition is mixed with an active material and optional electrically conductive carbon and other ingredients to give a slurry. A collector is coated with the slurry and then the liquid coating is dried to give an electrode.

As an example of the polymer binder, a polymer binder containing butadiene units has been proposed. For example, a butadiene rubber binder is described in Japanese Unexamined Patent Publication (hereinafter abbreviated to "JP-A") H4-255,670 and JP-A H7-335,221, and a polymer binder comprised of a styrene-butadiene latex is described in JP-A H9-320,604. A combination of a fluoropolymer with a polymer containing butadiene units is described in JP-A H6-215,761 and JP-A H9-213,337.

However, these heretofore proposed polymer binders containing butadiene units have been proved not to meet the requirements recently desired for achieving high battery performance such as satisfactory characteristics at repetition of charge-discharge cycles at a high temperature of 50° C. or higher or at a low temperature of 0° C. or lower, and satisfactory storage stability characteristics under temperature-varied conditions encountered when a high temperature storage and a low temperature storage are alternately repeated at heat-shock test (the storage stability characteristics are hereinafter referred to as "storage stability characteristics" for brevity when appropriate).

DISCLOSURE OF THE INVENTION

The present inventors made an extensive research to develop a lithium ion secondary battery exhibiting improved characteristics at repetition of charge-discharge cycles at a high temperature and a low temperature, and found that a polymer binder containing 1,3-butadiene units having a specific content of 1,2-vinyl bond gives a lithium ion secondary battery exhibiting good characteristics at repetition of charge-discharge cycles at a high temperature and a low temperature, and good storage stability characteristics.

Thus, in a first aspect of the present invention, there is provided a binder for a lithium ion secondary battery characterized by comprising a polymer containing structural units derived from 1,3-butadiene, said polymer having a 1,2-vinyl structure content in the range of 2% to 25% by mole.

In a second aspect of the present invention, there is provided a binder composition for a lithium ion secondary battery, comprising the above-mentioned binder and a dispersion medium having a boiling point at normal pressure in the range of 80° C. to 350° C., said binder being dispersed in the dispersion medium.

In a third aspect of the present invention, there is provided a slurry for a lithium ion secondary battery, comprising the above-mentioned binder composition and an active material.

In a fourth aspect of the present invention, there is provided an electrode made by using the above-mentioned binder.

In a fifth aspect of the present invention, there is provided a lithium ion secondary battery provided with the above-mentioned electrode.

BEST MODE FOR CARRYING OUT THE INVENTION

1. Binder

The binder for a lithium ion secondary battery of the present invention comprises a polymer containing structural units derived from 1,3-butadiene (which polymer is hereinafter referred to as "diene polymer" for brevity when appropriate), and said polymer having a content of 1,2-vinyl structure among the 1,3-butadiene structural units in the range of 2% to 25% by mole, preferably 3% to 22% by mole and more preferably 5% to 20% by mole, based on the diene polymer. When the 1,2-vinyl structure content in the diene polymer is in this range, the charge-discharge characteristics are stable even at a high temperature or a low temperature, and the storage stability characteristics are satisfactory. If the 1,2-vinyl structure content is too large, the binder tends to become rigid and an active material is liable to be separated from a collector at the step of making an electrode. In contrast, if the 1,2-vinyl structure content is too small, the polymer exhibits enhanced affinity to an active material and readily covers the entire surface of an active material particle with the result of reduction in battery capacity.

The content of 1,2-vinyl structure in a diene polymer, as used in the present invention, is measured by $^{13}$C-NMR spectrum.

The polymer used for a binder may be either a single polymer or a combination of at least two polymers, provided that the single polymer or at least one of the polymers contains 1,3-butadiene units. When two or more polymers are used for the preparation of a binder, by the term "1,2-vinyl structure content" as used herein, we mean the content of 1,2-vinyl structure in the total polymers.

A diene polymer used for a binder of the present invention will now be explained in detail.

A diene polymer used may contain, in addition to the essential structural units derived from 1,3-butadiene, optional structural units selected from, for example, structural units derived from an aromatic vinyl, structural units derived from an ethylenically unsaturated carboxylic acid ester, structural units derived from an ethylenically unsaturated carboxylic acid and structural units derived from an ethylenically unsaturated nitrile. The diene polymer may further contain structural units derived from a crosslinking monomer. The diene polymer containing crosslinking monomer structural units is preferable in view of enhanced resistance to an electrolyte solution.

The aromatic vinyl structural units are given by an aromatic vinyl monomer, which includes, for example, styrene, α-methylstyrene, p-methylstyrene and chlorostyrene. Of these, styrene and α-methylstyrene are preferable.

The ethylenically unsaturated carboxylic acid ester structural units are given by an ethylenically unsaturated carboxylic acid ester monomer, which includes, for example, acrylic acid esters such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate and lauryl acrylate; methacrylic acid esters such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxypropyl methacrylate and lauryl methacrylate; crotonic acid esters such as methyl crotonate, ethyl crotonate, propyl crotonate, butyl crotonate, isobutyl crotonate, n-amyl crotonate, isoamyl crotonate, n-hexyl crotonate, 2-ethylhexyl crotonate and hydroxypropyl crotonate; amino group-containing methacrylic acid esters such as dimethylamioethyl methacrylate and diethylamioethyl methacrylate; and alkoxy group-containing methacrylic acid esters such as methoxypolyethylene glycol monomethacrylate. Of these, acrylic acid alkyl esters and methacrylic acid alkyl esters, which alkyl group has 1 to 12 carbon atoms, preferably 2 to 8 carbon atoms, are preferable. Further, substituted alkyl esters of acrylic acid and substituted alkyl esters of methacrylic acid can also be used, which alkyl group has a substituent such as a phosphoric acid residue, a sulfonic acid acid residue or a boric acid residue.

The ethylenically unsaturated carboxylic acid structural units are given by an ethylenically unsaturated carboxylic acid monomer, which includes, for example, ethylenically unsaturated monocarboxylic acid monomers such as acrylic acid, methacrylic acid and crotonic acid; ethylenically unsaturated dicarboxylic acid monomers such as maleic acid, fumaric acid, citraconic acid, mesaconic acid, glutaconic acid and itaconic acid, and acid anhydrides of these dicarboxylic acid monomers.

The ethylenically unsaturated nitrile structural units are given by an ethylenically unsaturated nitrile monomer, which includes, for example, acrylonitrile and methacrylonitrile.

The structural units derived from a crosslinking monomer are given by polyfunctional monomers having ethylenically unsaturated bonds. As specific examples of the polyfunctional monomers, there can be mentioned divinyl compounds such as divinylbenzene; dimethacrylic acid esters such as diethylene glycol dimethacrylate and ethylene glycoldimethacrylate; trimethacrylic acid esters such as trimethylolpropane trimethacrylate; diacrylic acid esters such as polyethylene glycol diacrylate and 1,3-butylene glycol diacrylate; and triacrylic acid esters such as trimethylolpropane triacrylate. The amount of the units derived from a crosslinking monomer in a diene polymer is in the range of 0.1% to 20% by weight, preferably 0.5% to 15% by weight and more prerfeably 1% to 10% by weight, based on the weight of the total structural units constituting a diene polymer. When the amount of the units derived from a crosslinking monomer is in this range, characteristics at repetition of charge-discharge cycles at a high temperature become stable.

The diene polymer may contain structural units other than the above-mentioned structural units, which include, for example, structural units derived from an ethylenically aliphatic hydrocarbon monomer such as ethylene, and structural units derived from an ethylenically unsaturated amide monomer such as acrylamide. The amount of these structural units is not larger than 15% by weight, preferably not larger than 10% by weight and more preferably not larger than 5% by weight, based on the weight of the total structural units of diene polymer.

The diene polymer can be a copolymer comprising structural units derived from 1,3-butadiene and the above-recited structural units derived from comonomers (which copolymer is hereinafter referred to as "copolymer A" when appropriate).

As preferable examples of copolymer A, there can be mentioned a copolymer comprising 1,3-butadiene structural units, aromatic vinyl structural units and ethylenically unsaturated carboxylic acid ester structural units, a copolymer comprising 1,3-butadiene structural units and aromatic vinyl structural units, and a copolymer comprising 1,3-butadiene structural units and acrylonitrile structural units. A copolymer comprising 1,3-butadiene structural units, styrene structural units and methyl methacrylate or methyl acrylate structural units is especially preferable. These copolymers can be a random copolymer.

Especially, in a copolymer comprising (a) 1,3-butadiene units, (b) aromatic vinyl structural units and (c) ethylenically unsaturated carboxylic acid ester units, the amounts of the respective monomers are preferably (a) 20% to 70% by weight, (b) 20% to 70% by weight and (c) 10% to 60% by weight, based on the total weight of (a), (b) and (c). The sum of the three structural units (a), (b) and (c) is in the range of 70% to 100% by weight, preferably 80% to 100% by weight and more preferably 90% to 100% by weight. Further, polymer A preferably contains structural units derived from a crosslinking monomer in the hereinbefore-mentioned amount.

Poly-1,3-butadiene (hereinafter referred to as "polymer B" when appropriate) can be used as a diene polymer in the present invention. A combined use of polymer A with polymer B is preferable because the battery performance is far improved. For obtaining this benefit, the ratio by weight of polymer A/polymer B is in the range of 50/50 to 99/1, preferably 60/40 to 98/2 and more preferably 70/30 to 98/2.

If desired, a water-insoluble polymer containing no 1,3-butadiene units (which polymer is hereinafter referred to as "polymer C" when appropriate) may be used in combination with a diene polymer in the present invention. Polymer C includes, for example, a fluoropolymer, an olefin polymer, a styrene polymer, an acrylate polymer, an amide polymer, an imide polymer, a nitrile polymer and an ester polymer, all of which do not contain 1,3-butadiene structural units. The amount of polymer C as used in combination with a diene polymer is usually not larger than 50% by weight, preferably 30% by weight and more preferably not larger than 20% by weight, based on the total weight of diene polymers, i.e., the sum of polymer A and polymer B.

If desired, polymers other than polymer A, polymer B and polymer C may be additionally used (which polymers are hereinafter referred to as "polymer D" when appropriate). As specific examples of polymer D, there can be mentioned cellulose derivatives such as carboxymethyl cellulose, methyl cellulose, hydroxypropyl cellulose, and their ammonium salts and alkali metal salts; polycarboxylic acids and alkali metal salts thereof, such as modified acrylic acid, modified methacrylic acid, poly-sodium acrylate and poly-sodium methacrylate; polymers containing a large amount of hydroxyl group such as polyvinyl alcohol, modified polyvinyl alcohol, polyethylene glycol and an ethylene-vinyl alcohol copolymer; and other hydroxyl group-containing polymers such as a copolymer of vinyl alcohol with acrylic acid or its salt or methacrylic acid or its salt, and a copolymer of vinyl alcohol with maleic anhydride, maleic acid or fumaric acid.

Examples of especially preferable polymer D are an alkali metal salt of carboxymethyl cellulose, an ethylene-vinyl alcohol copolymer and derivatives thereof. When the dispersing medium in a binder composition is water, an alkali metal salt of carboxymethyl cellulose, polyacrylic acid and its alkali metal salt, polymethacrylic acid and its alkali metal salt are especially preferable. When the dispersing medium in a binder composition is an organic liquid medium, an ethylene-vinyl alcohol copolymer and its derivatives are preferable.

By the combined use of polymer D, the viscosity and fluidity of an slurry for electrode, mentioned below, can be appropriately enhanced and coatability of a collector with the slurry is improved. Consequently the electrode can be easily made.

When polymer D is used in combination with a diene polymer, the amount of polymer D is such that the ratio by weight of the total amount of diene polymer (i.e., polymer A and/or polymer B) and polymer C to the amount of polymer D is in the range of 95/5 to 5/95, preferably 80/20 to 20/80 and more preferably 75/25 to 25/75.

2. Binder Composition

The binder composition of the present invention comprises at least the above-mentioned diene polymer (i.e., polymer A and/or polymer B) and a dispersion medium, said binder beingh dispersed in the dispersion medium. As mentioned above, polymer C and/or polymer D may be contained in the binder composition. Polymer C and polymer D may be present in the binder composition in any of a state wherein these polymers are dispersed in the dispersion medium, a state wherein these polymers are adsorbed on or embedded in particles of other polymer, and a state wherein these polymers are dissolved in the dispersion medium.

The amount of diene polymer, i.e., the total amount of polymer A and/or polymer B, in the binder composition is usually in the range of 0.2% to 80% by weight, preferably 0.5% to 70% by weight and more preferably 0.5% to 60% by weight.

The dispersion medium used in the present invention for formation of the binder dispersion has a boiling point at normal pressure in the range of 80° C. to 350° C., preferably 100° C. to 300° C.

As examples of the dispersion medium, there can be mentioned the following substances. Numeral within each parenthesis denotes a boiling point at normal pressure as expressed by counting fractions of 0.5 and over as a whole number and disregarding the rest. As for substances as observed as having a broad boiling point range, it was confirmed that the lower limit of boiling point range was 80° C. or higher, and the upper limit of boiling point range was inserted. Water (100); hydrocarbons such as n-dodecane (216) and tetralin (207); alcohols such as 2-ethyl-1-hexanol (184) and 1-nonanol (214); ketones such as phorone (197), acetophenone (202) and isophorone (215); esters such as benzyl acetate (213), isopentyl butyrate (184), γ-butyrolactone (204), methyl lactate (143), ethyl lactate (154) and butyl lactate (185); amines such as o-toluidine (200), m-toluidine (204) and p-toluidine (201); amides such as N-methyl-2-pyrrolidone (202), N,N-dimethylacetamide (194) and dimethylforamide (153); and sulfoxides and sulfones, such as dimethylsulfoxide (189) and sulfolane (287).

At least the diene polymer is in the form of particles and dispersed in the dispersing medium. The presence of particles can easily be confirmed by a transmission electron microscope or an optical microscope. The volume average particle diameter of the particles is in the range of 0.001 µm to 1 mm and preferably 0.01 µm to 500 µm. The volume average particle diameter can easily be measured by a Coulter counter or a microtrack.

The method for preparing the binder composition of the present invention is not particularly limited. For example, there can be mentioned a method of preparing a latex wherein a diene polymer (i.e., polymer A and/or polymer B) is dispersed in water, which latex may be used either as it is, or after water contained therein is substituted by the above-mentioned organic dispersing medium to prepare a polymer dispersion in the organic dispersion medium. As the procedure by which water is substituted by the organic dispersing medium, there can be mentioned a procedure of incorporating the organic dispersion medium in latex, followed by removal of water from the water/organic dispersion medium mixture by distillation, fractional filtration or dispersion-medium phase conversion. Polymer C and/or polymer D can be made by an appropriate method and incorporated in the dispersion of the diene polymer.

When polymer A is used in combination with polymer B, as diene polymer, usually a latex of a polymer A and a latex of polymer B are separately prepared. Then, when a binder composition in the form of an aqueous dispersion of polymers is made, the latex of polymer A and the latex of polymer B are mixed together and optional ingredients are incorporated in the polymer A/polymer B mixture. When a binder composition in the form of a polymer dispersion in an organic dispersion medium is made, the latex of polymer A and the latex of polymer B are separately subjected to dispersion-medium phase conversion and thereafter the two polymer dispersions are mixed together, or, the latex of polymer A and the latex of polymer B are first mixed together and then the mixed latex is subjected to dispersion-medium phase conversion. Then optional ingredients are added to the polymer dispersion.

A method of producing an aqueous dispersion (latex) of a diene polymer is not particularly limited. For example, an emulsion polymerization method described in Jikkan Kagaku Koza, vol. 28, edited by Nihon Kagakukai [Japanese Chemical Society] and published by Maruzen K.K.), namely, a method wherein a closed vessel provided with a stirrer and a heating means is charged with water, an emulsifying agent, a crosslinking agent and other additives, an initiator and monomers to prepare a monomer charge having a predetermined composition; the monomer charge is stirred whereby the monomers are emulsified in water; and then the temperature is elevated while the monomer charge is stirred, to carry out a polymerization to obtain a latex which is an aqueous dispersion of diene polymer in water. The emulsifying agent, the initiator and the other ingredients can be chosen from those which are widely used in emulsion polymerization, and the amounts thereof may be conventional. A seed polymerization using a seed particle can also be conducted.

To a latex produced by the above-mentioned polymerization method, an aqueous basic solution can be added to adjust the pH value so as to fall in the range of 5 to 13, preferably 6 to 12. The basic aqueous solution is an aqueous solution of a base, for example, a hydroxide of an alkali metal such as Li, Na, K, Rb or Cs; ammonia; inorganic ammonium compound such as $NH_4Cl$, or an organic amine compound such as ethanolamine or diethylamine. Among others, the pH adjustment using ammonia or an alkali metal hydroxide is preferable because a bonding force (peel strength) between a collector and an active material can be enhanced.

It is important that the polymer binder in the binder composition of the present invention is insoluble or only slightly soluble in an electrolyte solution for the polymer exhibits a function of binder. Thus, the polymer in the binder composition preferably has a gel content, as calculated as insoluble matter in an electrolyte solution, of 50% to 100% by weight, more preferably 60% to 100% by weight and especially preferably 70% to 100% by weight. The gel content in an electrolyte solution (hereinafter referred to as "gel content G1") used herein means that as calculated as a ratio in % by weight of insoluble matter to an electrolyte solution, which is a one mole/liter solution of $LiPF_6$ in a mixed solvent comprised of propylene carbonate/ethylene carbonate/diethyl carbonate/dimethyl carbonate/methylethyl carbonate at a ratio of 20/20/20/20/20 by volume at 20° C.

Gel content G1 of polymer is determined as follows. A filmy coating of binder polymer having a thickness of about 0.1 mm is air-dried at 120° C. for 24 hours and further vacuum-dried at 120° C. for 24 hours. The dry film is weighed (the weight is referred to as "D1"). Then the dry film is dipped in the electrolyte solution in an amount of 100 times by weight of the dry film at 70° C. for 74 hours. The dipped film is filtered by a wire mesh with 200 mesh size. The insoluble matter remaining on the wire mesh is vacuum-dried at 120° C. for 24 hours and then weighed (the weight is referred to as "D2"). Gel content G1 of polymer is calculated according to the equation:

$$\text{Gel content } G1\ (\%) = (D2/D1) \times 100$$

It is also important that at least a diene polymer (namely, polymer A and/or polymer B) in the binder composition of the present invention is insoluble or only slightly soluble in a dispersion medium for the polymer exhibits a function of binder suitable for a battery electrode. Thus, the polymer in the binder composition preferably has a gel content, as calculated as insoluble matter in the particular dispersion medium used in the binder composition, of 50% to 100% by weight, more preferably 60% to 100% by weight and especially preferably 70% to 100% by weight. When the gel content of polymer in dispersion medium is in this range, the characteristics at repetition of charge-discharge cycle at a high temperature and a low temperature as well as the initial discharge capacity at a low temperature are good, and the storage stability characteristics are good.

The gel content in the dispersion medium (hereinafter referred to as "gel content G2") used herein means that as calculated as a ratio in % by weight of insoluble matter to the dispersion medium. Gel content G2 of polymer is determined as follows. The dry polymer binder film having a weight of D1 as prepared in the same manner as determination of gel content G1 is dipped in the dispersion medium in an amount of 100 times by weight of the dry film at 30° C. for 24 hours. The dipped film is filtered by a wire mesh with 200 mesh size. The insoluble matter remaining on the wire mesh is vacuum-dried at 120° C. for 24 hours and then weighed (the weight is referred to as "D3"). Gel content G2 of polymer is calculated according to the equation:

$$\text{Gel content } G2(\%) = (D3/D1) \times 100$$

The binder composition of the present invention can contain ingredients other than the above-mentioned ingredients, such as an additive, for example, a surface active agent. The additive is dispersed or dissolved in the binder composition.

3. Slurry for Electrode for Battery

The slurry of the present invention is prepared by incorporating an active material and optional additives in the above-mentioned binder composition.

Active Material

The active material is not particularly limited provided that it is used for ordinary lithium ion secondary batteries.

As specific examples of the active material used for a negative electrode, there can be mentioned carbonaceous materials such as amorphous carbon, graphite, natural graphite, MCME, and pitch carbon fiber; electrically conductive polymers such as polyacene; and composite metal oxides and other metal oxides. The binder of the present invention is especially suitable for the use of carbonaceous materials.

As specific examples of the active material used for a positive electrode, there can be mentioned transition metal oxides such as $TiS_2$, $TiS_3$, amorphous $MoS_3$, $Cu_2V_2O_3$, amorphous $V_2O$—$P_2O_5$, $MoO_3$, $V_2O_5$ and $V_6O_{13}$; and lithium-containing composite metal oxides such as $LiCoO_2$, $LiNiO_2$, $LiMnO_2$ and $LiMn_2O_4$. The active material for a positive electrode further includes organic compounds including electrically conductive polymers such as polyacetylene and poly-p-phenylene. The binder of the present invention is especially suitable for the use of lithium-containing composite metal oxides such as $LiCoO_2$, $LiN1O_2$ and $LiMn_2O_4$.

The amount of an active material in the slurry for a battery electrode of the present invention is not particularly limited and is usually 1 to 1,000 times, preferably 2 to 500 times, more preferably 5 to 500 times and especially preferably 10 to 300 times, of the weight of the solid content in the binder composition. When the amount of an active material is too small, an active material layer formed on a collector has a reduced activity and the electrode is liable to have poor performances. In contrast, when the amount of an active material is too large, the adhesion of the active material to a collector becomes poor and the active material tends to be fallen from the collector. A liquid medium such as water or an organic dispersion medium can be added to the slurry so that the concentration of an active material in the slurry is suitable for coating a collector with the slurry.

Additives

According to the need, the above-mentioned polymer C and polymer D and other additives can be further incorporated in the slurry. Further, electrically conductive materials including carbon such as graphite and active carbon, and a metal powder, can be incorporated in the slurry.

4. Electrode for Lithium Ion Secondary Battery

The electrode of the present invention contains the binder of the present invention, and is made by using the above-mentioned slurry. That is, the electrode is preferably made by coating a collector such as a metal foil with the above-mentioned slurry, and drying a coating of the slurry to fix an active material on the collector. The electrode may be either a positive electrode or a negative electrode.

The collector used is not particularly limited provided that it is composed of an electrically conductive material. The collector is usually composed of metal such as iron, copper, aluminum, nickel or stainless steel. The binder of the present invention is especially suitable for the use of aluminum for positive electrode and copper for negative electrode. The shape of the collector is also not particularly limited, and the collector is usually used in a sheet form having a thickness of about 0.001 mm to 0.5 mm.

The procedure of coating the collector with the slurry is not particularly limited. The collector can be coated with the slurry by a conventional coating procedure such as doctor-blade coating, dip coating, reverse-roll coating, direct-roll coating, gravure coating, extrusion coating and brush coating. The amount of the slurry applied is not particularly limited, and is usually such that the thickness of the active material layer, formed by removing water or an organic dispersion medium by drying a coating of the slurry, has a thickness of 0.005 mm to 5 mm, preferably 0.01 mm to 2 mm. The procedure for drying an as-formed coating is not particularly limited, and includes, for example, warm-air drying, hot-air drying, low-humid-air drying, vacuum drying, infrared drying, far-infrared drying and electron radiation drying. The drying conditions should be chosen so that water or an organic dispersion medium used is removed as soon as possible but at a rate such that occurrence of stress crack in the active material layer due to stress concentration, and separation of the active material layer from the collector can be avoided.

If desired, the coated collector can be pressed after drying to enhance the density of the active material layer. The pressing can be carried out, for example, by a mold pressing and a roll pressing.

5. Lithium Ion Secondary Battery

The lithium ion secondary battery of the present invention comprises the above-mentioned electrode and an electrolyte solution, and, according to the need, a separator and other elements. The lithium ion secondary battery is fabricated by an ordinary procedure. For example, a positive electrode and a negative electrode are superposed with a separator interposed between the two electrodes, and the thus-formed assembly is wound or folded and then inserted into a vessel. An electrolyte solution is introduced into the vessel, and the vessel is sealed. The shape of the secondary battery is not particularly limited, and is, for example, coin-shape, button-shape, sheet-shape, cylindrical shape, rectangular shape and flat shape.

The electrolyte solution is in any form of gel or liquid and is selected from those which are conventionally used for a lithium ion secondary battery. A suitable electrolyte solution can be chosen depending upon the particular active material used for a positive electrode or a negative electrode so as to obtain the desired battery performances.

The electrolyte of the secondary battery includes known lithium salts. As specific examples of the electrolyte, there can be mentioned $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and a lower carboxylic acid lithium salt.

The liquid medium used for dissolving the electrolyte is not particularly limited and includes conventional liquid mediums. As specific examples of the liquid medium, there can be mentioned carbonates such as propylene carbonate, ethylene carbonate, butylene carbonate, dimethyl carbonate and diethyl carbonate; lactones such as γ-butyrolactone; ethers such as trimethoxymethane, 1,2-dimethoxyethane, diethyl ether, 2-ethoxyethane, tetrahydrofuran and 2-methyltetrahydrofurn; sulfoxides such as dimethylsulfoxide; oxolanes such as 1,3-dioxolane and 4-methyl-1,3-dioxolane; nitrogen-containing compounds such as acetonitrile and nitromethane; organic acid esters such as methyl formate, methyl acetate, ethyl acetate, butyl acetate, methyl propionate and ethyl propionate; inorganic acid esters such as phosphoric acid triesters and carbonic acid diesters including dipropyl carbonate; diglymes; triglymes; sulfolanes; oxazolidinones such as 3-methyl-2-oxazolidinone; and sultones such as 1,3-propanesultone, 1,4-butanesultone and naphthasultone. These liquid mediums may be used either alone or as a mixed liquid comprised of at least two thereof.

When the eletrolyte used is in a gel form, a gelling agent such as a nitrile polymer, an acrylic polymer, a fluoropolymer or an alkylene oxide polymer can be added.

The invention will now be described more specifically by the following working examples that by no means limit the scope of the invention.

In the working examples, parts and % are by weight unless otherwise specified.

The evaluation of properties of a binder composition, an electrode and a battery was carried out by the following methods.

(1) Folding

An electrode was cut into rectangular specimens having a size of 3 cm width×9 cm length. A stainless steel wire having a diameter of 1 mm was placed at the center (located 4.5 cm apart from the both ends) of the length of each specimen, to form a fold line. Each specimen was folded 180° on its fold line formed by the stainless steel wire. The folding test was conducted on 10 specimens. Appearance of filmy coating in the folded portion of each specimen was observed. The evaluation results were expressed by the following two ratings.

A: Crack did not occur and partial film separation was not observed on all of 10 specimens.

B: Crack occurred or partial film separation was observed on at least one specimen.

(2) Peel Strength

An electrode was cut into rectangular specimens having the same size as mentioned in (1) above. A pressure-sensitive adhesive tape ("Cellotape" available from Nichiban K.K., JIS Z1522) was adhered on each rectangular specimen. The adhesive tape-adhered specimen was fixed, and the tape was rapidly peeled from the fixed specimen to measure peel strength (unit: g/cm). The peeling test was conducted on 10 specimens and the test results were expressed by an average peel strength.

(3) Initial Service Capacity of Battery at Repetition of Charge-Discharge Cycle at High and Low Temperatures Charge-discharge cycle was carried out in a manner mentioned in (4) below at high temperature and low temperature, and the service capacity was measured at completion of the fifth cycle.

(4) Characteristics of Battery at Repetition of Charge-Discharge Cycle at High Temperature and Low Temperature A coin-shaped secondary battery specimen was fabricated by the method described below. A charge-discharge cycle test was conducted by measuring service capacity of the battery, while a cycle of charging the battery and then discharging it was repeated at an atmosphere temperature of 65° C. or −10° C. and at a constant current rate of 0.2 C.

For the test of a negative electrode, a charge-discharge cycle was repeated in a voltage range of 0 V to 1.2 V by using a positive electrode made of metallic lithium (Examples 1–3, Comparative Example 1). For the test of a positive electrode, a charge-discharge cycle was repeated in a voltage range of 3 V to 4.2 V by using a negative electrode made of metallic lithium (Examples 4–6, Comparative Example 2).

The measurement of service capacity was carried out when the fifth cycle and the 50th cycle were completed. The capacity was expressed in mAh/g of active material in the electrode (the unit of capacity is hereinafter expressed in mAh/g of active material). The ratio of service capacity at the 50th cycle to service capacity at the fifth cycle was calculated. The larger the service capacity ratio, the smaller the reduction of service capacity, namely, the better the characteristics at repetition of charge-discharge cycle.

(5) Storage Stability Characteristics by Heat-shock Method

Using a coin-shaped secondary battery fabricated by the method described below, service capacity at the fifth cycle was measured at a charge voltage of 4.2 V and at an atmospheric temperature of 20° C. in the manner as mentioned in (4) above. Then the battery was left to stand in an atmospheric temperature of 80° C. for 30 minutes and then in an atmospheric temperature of −20° C. for 30 minutes. This heat-shock cycle was repeated ten times. Again the battery was placed in an atmosphere maintained at 20° C., and a charge-discharge cycle test was conducted in the same manner as described in (4) above, to measure service capacity of the battery at completion of the fifth cycle. Storage stability characteristics were evaluated by the ratio of service capacity as measured after the repetition of heat-shock cycle to service capacity as measured before the initiation of repetition of heat-shock cycle. The larger the service capacity ratio, the smaller the reduction of service capacity by heat-shock, namely, the better the storage stability characteristics.

(6) Fabrication of Coin-Shaped Battery

Coin-shaped secondary battery was fabricated as follows. An aluminum foil collector having a thickness of 20 μm was uniformly coated with an active material-containing slurry for positive electrode by a doctor blade. A copper foil collector having a thickness of 18 μm was uniformly coated with an active material-containing slurry for negative electrode by a doctor blade. Each as-formed coating was dried at 120° C. for 15 minutes in a drier, and further vacuum-dried under 5 mmHg at 120° C. for 2 hours. The dried coated aluminum foil was pressed by a twin roll press so that the density of an active material is 3.2 g/cm$^3$ to prepare a positive electrode having an active material layer. The dried coated copper foil was pressed by a twin roll press so that the density of an active material was 1.5 g/cm$^3$ to prepare a negative electrode having an active material layer.

Each of the aluminum positive electrode and the copper negative electrode was cut into a circular shape having a diameter of 15 mm. A battery was fabricated by using the circular aluminum positive electrode and a lithium metal negative electrode, or, the circular copper negative electrode and a lithium metal negative electrode, and a separator. The separator was sandwiched between the positive electrode and the negative electrode so that the active material layers of the two electrodes confront to each other. The separator was comprised of a circular porous polypropylene film having a diameter of 18 mm and a thickness of 25 μm. An assembly composed of the positive electrode, the separator, and the negative electrode was placed in a coin-shaped outer casing having a diameter of 20 mm and a height of 1.8 mm and made of a stainless steel sheet having a thickness 0.25 mm, so that the aluminum foil positive electrode or the lithium metal positive electrode was kept in contact with the casing bottom. An expanded metal part was placed on the negative electrode. A polypropylene packing was packed within the casing. An electrolyte solution was injected into the casing so that no air remains within the casing. The thus-fabricated assembly was covered with a stainless steel cap having a thickness of 0.2 mm via the polypropylene packing. The assembly-packed casing was sealed whereby a coin-shaped battery having a diameter of 20 mm and a thickness of about 2 mm was obtained. The electrolyte solution was a solution of LiPF$_6$ with a concentration of 1 mol/liter of a mixed liquid composed of propylene carbonate/ethylene carbonate/diethyl carbonate/dimethyl carbonate/methylethyl carbonate at a mixing ratio of 20/20/20/20/20 (volume ratio at 20° C.).

(7) 1,2-Vinyl Structure Content in Binder Composition

A binder composition was placed on an aluminum dish and dried at a temperature of 105° C. for 5 hours by a drier. The dried binder composition was subjected to Soxhlet extraction using methanol for 8 hours. The extracted residue was dried by a vacuum drier and then the dried residue was chopped into small pieces. A test tube having a diameter of 5 mm for NMR measurement was packed with the small pieces, and deuterated chloroform was added. Using a $^{13}$C-NMR measuring apparatus ("EX-400" available from JEOL Ltd.), the 1,2-vinyl structure content was determined. The 1,2-vinyl structure contents in Table 2 and Table 3 are by mole based on the total polymer binder.

Examples 1–3

Comparative Example 1

Production of Polymer A

By an emulsion polymerization method, three kinds of latexes of polymer A, namely, polymers A1, A2 and A3, which were comprised of structural units derived from monomers recited in Table 1. The solid content in each latex was 50%.

Production of Polymer B

By an emulsion polymerization method, a latex of polybutadiene (polymer B1; solid content in latex: 50%) having a 1,2-vinyl structure content of 18% by mole was obtained.

Separately, a latex of polybutadiene (polymer B2; solid content in latex: 50%) having a 1,2-vinyl structure content of 40% by mole was produced as follows. Polybutadiene was prepared by an anion polymerization method using a lithium-containing catalyst. The polybutadiene was dissolved in tetrahydrofuran. The polymer solution was poured into water and the polymer was suspended in water in the presence of an emulsifier and a crosslinking agent. Tetrahydrofuran was removed from the suspension by heating to give the latex of polymer B1.

Preparation of Binder Composition

Three kinds of binder compositions were prepared as follows. Predetermined amounts of the latex of polymer A and the latex of polymer B were mixed together to give a binder composition containing water as dispersion medium. The aqueous dispersion medium in the binder composition was substituted by N-methyl-2-pyrrolidone or ethyl lactate to give two binder compositions containing N-methyl-2-pyrrolidone or ethyl lactate as dispersion medium.

According to the recipes shown in Table 2 and Table 3, each binder composition in an amount such that the solid content was 2 parts was mixed together with 2 parts of polymer C or polymer D and 96 parts of natural graphite, and further, the same dispersion medium as contained in the particular binder composition was added with stirring in an amount such that a uniform slurry having a solid content of 42% was obtained.

Using the thus-obtained slurry, a negative electrode was made by the above-mentioned method, and battery characteristics were evaluated. The results are shown in Table 2 and Table 3.

As the polymer C or polymer D, the following polymers were used (the find of polymer C or polymer D was varied depending upon the particular dispersion medium contained in the binder composition).

| Polymer C or polymer D | Dispersion medium |
|---|---|
| Carboxymethyl cellulose sodium salt (CMC-Na) | Water |
| Ethylene-vinyl alcohol copolymer (EVA) (ethylene content: 44 mole %) | N-methyl-2-pyrrolidone (NMP) |
| Polyacrylonitrile (AN) | Ethyl lactate (EL) |

Note, abbreviations occurring within parentheses are the same as used in Table 2

TABLE 1

| Polymer A | A1 | A2 | A3 |
|---|---|---|---|
| Composition of polymer A (%) | | | |
| Methyl methacrylate | 11.8 | 17.7 | 16.4 |
| Hydroxyethyl acrylate | 2.0 | 0 | 1.0 |
| Itaconic acid | 3.5 | 4.3 | 2.5 |
| Acrylic acid | 1.0 | 0 | 0 |
| 1,3-Butadiene | 36.3 | 44.0 | 41.1 |
| Styrene | 36.8 | 27.6 | 32.7 |
| Acrylonitrile | 7.5 | 3.4 | 5.1 |
| Divinylbenzene | 1.1 | 1.5 | 0 |
| Acrylamide | 0 | 1.5 | 1.2 |

Examples 4–6

Comparative Example 2

According to the recipes shown in Table 2 and Table 3, each binder composition in an amount such that the solid content was 1.5 parts was mixed together with 1.5 parts of polymer C or polymer D, 92 parts of lithium cobaltate and 5 parts of carbon black as electrically conductive material, and further, the same dispersion medium as contained in the particular binder composition was added with stirring in an amount such that a uniform slurry having a solid content of 55% was obtained.

Using the thus-obtained slurry, a positive electrode was made by the above-mentioned method, and battery characteristics were evaluated. The results are shown in Table 2 and Table 3.

As the polymer C or polymer D, the following polymers were used.

| Polymer C or polymer D | Dispersion medium |
|---|---|
| Carboxymethyl cellulose sodium salt (CMC-Na) | Water |
| Ethylene-vinyl alcohol copolymer (EVA) (ethylene content: 44 mole %) | N-methyl-2-pyrrolidone (NMP) |
| Polyacrylonitrile (AN) | Ethyl lactate (EL) |

TABLE 2

| | Examples No. | | | | | |
|---|---|---|---|---|---|---|
| | 1 | 2 | 3 | 4 | 5 | 6 |
| Binder composition | | | | | | |
| Polymer A, kind | A1 | A2 | A3 | A1 | A2 | A3 |
| amount (wt. %) | (75) | (85) | (95) | (70) | (80) | (90) |
| Polymer B, kind | B1 | B2 | B1 | B1 | B2 | B1 |
| amount (wt. %) | (25) | (15) | (5) | (30) | (20) | (10) |
| 1,2-Vinyl structure content (mole %) | 10 | 13 | 7 | 11 | 14 | 8 |
| Gel content, | | | | | | |
| G1 | 96.1 | 95.8 | 95.2 | 96.2 | 95.4 | 95.8 |
| G2 | 99.3 | 95.5 | 99.1 | 94.7 | 98.9 | 99.0 |
| Dispersion medium | Water | EL | Water | NMP | Water | Water |
| Polymer content (wt. %) | 50 | 15 | 40 | 10 | 30 | 50 |
| Polymer C or D, kind | CMC-Na | AN | CMC-Na | EVA | CMC-Na | CMC-Na |
| Electrode | Nega. | Nega. | Nega. | Posi. | Posi. | Posi |
| Evaluation of properties | | | | | | |
| Folding | A | A | A | A | A | A |
| Peel strength (g/m) | 63 | 54 | 59 | 114 | 98 | 105 |
| Initial service capacity at high temp. (mAh/g) | 335 | 330 | 345 | 141 | 135 | 143 |
| Characteristics at repetition of charge-discharge cycle at high temp. (%) | 84 | 80 | 82 | 86 | 84 | 87 |
| Initial service capacity at low temp. (mAh/g) | 340 | 328 | 336 | 134 | 131 | 140 |
| Characteristics at repetition of charge-discharge cycle at low temp. (%) | 81 | 79 | 79 | 84 | 81 | 82 |
| Storage stability (%) | 97 | 95 | 97 | 97 | 96 | 96 |

TABLE 3

| | Comparative Example No. | |
|---|---|---|
| | 1 | 2 |
| Binder composition | | |
| Polymer A, kind | A1 | A2 |
| amount (wt. %) | (40) | (40) |
| Polymer B, kind | B2 | B2 |
| amount (wt. %) | (60) | (60) |
| 1,2-Vinyl structure content (mole %) | 29 | 29 |
| Gel content, | | |
| G1 | 96.1 | 96.1 |
| G2 | 99.3 | 99.3 |
| Dispersion medium | Water | Water |
| Polymer content (wt. %) | 50 | 50 |
| Polymer C or D, kind | CMC-Na | CMC-Na |
| Electrode | Nega. | Posi. |
| Evaluation of properties | | |
| Folding | A | A |
| Peel strength (g/m) | 35 | 66 |
| Initial service capacity at high temp. (mAh/g) | 302 | 112 |
| Characteristics at repetition of charge-discharge cycle at high temp. (%) | 67 | 70 |
| Initial service capacity at low temp. (mAh/g) | 294 | 109 |

TABLE 3-continued

|  | Comparative Example No. | |
| --- | --- | --- |
|  | 1 | 2 |
| Characteristics at repetition of charge-discharge cycle at low temp. (%) | 70 | 65 |
| Storage stability (%) | 81 | 79 |

As seen from the above results, a polymer containing units derived from 1,3-butadiene and having a 1,2-vinyl structure content in the range of 2% to 25% by mole based on the total polymer is used as a binder for making an electrode, a lithium ion secondary battery having improved battery characteristics is obtained.

INDUSTRIAL APPLICABILITY

When the binder of the present invention is used for making an electrode for a lithium ion secondary battery, an electrode exhibiting enhanced bonding property to a collector can be made. A lithium ion secondary battery provided with this electrode has improved characteristics at repetition of charge-discharge cycle. More specifically, this lithium ion secondary battery exhibits improved characteristics at repetition of charge-discharge cycle at a high temperature or low temperature, and has improved storage stability. The binder of the present invention is also used for making an electrode for a non-aqueous electrolyte capacitor.

What is claimed is:

1. A slurry for a lithium ion secondary battery, comprising (i) a binder comprising a polymer containing structural units derived from 1,3-butadiene, said polymer having a 1,2-vinyl structure content in the range of 2% to 25% by mole based on the polymer and comprising 0% to 15% by weight, based on the weight of the total structural units of the polymer, of structural units derived from an ethylenically aliphatic hydrocarbon monomer, (ii) an active material, and (iii) a dispersion medium having a boiling point at normal pressure in the range of 80° C. to 350° C.

2. The slurry for a lithium ion secondary battery according to claim 1, wherein the polymer containing structural units derived from 1,3-butadiene is a copolymer containing structural units derived from 1,3-butadiene, structural units derived from an aromatic vinyl and structural units derived from an ethylenically unsaturated carboxylic acid ester.

3. The slurry for a lithium ion secondary battery according to claim 2, wherein said copolymer is a random copolymer.

4. The slurry for a lithium ion secondary battery according to claim 1, wherein the polymer containing structural units derived from 1,3-butadiene is a poly-1,3-butadiene.

5. The slurry for a lithium secondary battery according to claim 1, wherein the polymer containing structural units derived from 1,3-butadiene has a 1,2-vinyl structure content in the range of 5% to 20% by mole based on the polymer.

6. The slurry for a lithium ion secondary battery according to claim 1, wherein said polymer is a mixture comprised of a copolymer containing structural units derived from 1,3-butadiene, structural units derived from an aromatic vinyl and structural units derived from an ethylenically unsaturated carboxylic acid ester, and poly-1,3-butadiene.

7. The slurry for a lithium ion secondary battery according to claim 6, wherein the ratio of the copolymer containing structural units derived from 1,3-butadiene, structural units derived from an aromatic vinyl and structural units derived from an ethylenically unsaturated carboxylic acid ester, to the poly-1,3-butadiene is in the range of 50/50 to 99/1 by weight.

8. An electrode made by using the slurry as claimed in claim 1.

9. A lithium ion secondary battery provided with an electrode as claimed in claim 8.

* * * * *